US006977927B1

(12) United States Patent
Bates et al.

(10) Patent No.: US 6,977,927 B1
(45) Date of Patent: Dec. 20, 2005

(54) METHOD AND SYSTEM OF ALLOCATING STORAGE RESOURCES IN A STORAGE AREA NETWORK

(75) Inventors: John W. Bates, Mendon, MA (US); Nicos A. Vekiarides, Dedham, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 846 days.

(21) Appl. No.: 09/664,500

(22) Filed: Sep. 18, 2000

(51) Int. Cl.[7] .............................................. H04L 12/54

(52) U.S. Cl. ........................ 370/381; 370/428; 707/10; 709/211; 709/223; 711/111; 711/152; 711/163; 711/170; 711/202

(58) Field of Search ................................ 370/381–383, 370/428; 709/208, 211, 223, 224, 226; 711/100, 711/111, 112, 154, 163, 170, 152, 202; 707/10

(56) References Cited

U.S. PATENT DOCUMENTS 4,274,139 A 6/1981 Hodgkinson et al. ....... 364/200
4,404,647 A 9/1983 Jones et al. ................. 364/900
4,611,298 A 9/1986 Schuldt ...................... 364/900
4,654,819 A 3/1987 Stiffler et al. ............... 364/900
4,688,221 A 8/1987 Nakamura et al. ............ 371/13
4,701,915 A 10/1987 Kitamura et al. ............. 371/13
4,942,579 A 7/1990 Goodlander et al. .......... 371/51
4,996,687 A 2/1991 Hess et al. ................. 371/10.1
5,051,887 A 9/1991 Berger et al. ............... 364/200
5,129,088 A 7/1992 Auslander et al. .......... 395/700
5,136,523 A 8/1992 Landers ....................... 395/54
5,138,710 A 8/1992 Kruesi et al. ............... 395/575
5,155,845 A 10/1992 Beal et al. ................. 395/575
5,157,663 A 10/1992 Major et al. ................. 371/9.1
5,167,011 A 11/1992 Priest .......................... 395/54
5,175,849 A 12/1992 Schneider ................... 395/600
5,185,884 A 2/1993 Martin et al. ............... 395/575
5,206,939 A 4/1993 Yanai et al. ................ 395/400
5,212,784 A 5/1993 Sparks ....................... 395/575
5,212,789 A 5/1993 Rago .......................... 395/600
5,235,601 A 8/1993 Stallmo et al. ............ 371/40.1
5,257,367 A 10/1993 Goodlander et al. ........ 395/600
5,263,154 A 11/1993 Eastridge et al. ........... 395/575

(Continued)

FOREIGN PATENT DOCUMENTS

EP 0 767 427 A2 4/1997 ............. G06F 9/46

(Continued)

OTHER PUBLICATIONS

Symmetrix 3000 and 5000 Enterprise Storage Systems Product Decription Guide, EMC Corporation, downloaded in Sep. 2000, from http://www.emc.com/products/product_pdfs/pdg/symm_3_5_pdg.pdf, pp. 1-32.

(Continued)

*Primary Examiner*—Steven Nguyen
*Assistant Examiner*—Roberta Shand

(57) ABSTRACT

A system for allocating storage resources in a storage area network is described. A logical unit number (LUN) mapper receives at least one storage request parameter and maps the storage request parameters to at least one physical LUN. The LUN mapper includes at least one LUN map. The storage request parameters include a host id parameter, a target LUN parameter, and a target host bus adaptor (HBA) parameter. The LUN mapper uses the host id parameter to select the one of the LUN maps that corresponds to the host id parameter. The LUN mapper applies the target LUN parameter and the target HBA parameter to the selected LUN map to locate the physical LUN(s) stored in the selected LUN map. The LUN mapper issues the received read/write storage request to at least one storage device that houses the physical LUN(s). The one or more storage devices are located in the storage area network.

10 Claims, 10 Drawing Sheets

Read/Write Storage Request 210
104
Network Interface 202
Read/Write Storage Request Parser 204
LUN Mapper 206
SAN Interface 208
Physical LUN Read/Write Request 212

U.S. PATENT DOCUMENTS 5,276,867 A 1/1994 Kenley et al. .............. 395/600
5,278,838 A 1/1994 Ng et al. ................... 371/10.1
5,317,731 A 5/1994 Dias et al. .................. 395/600
5,325,505 A 6/1994 Hoffecker et al. .......... 395/425
5,347,653 A 9/1994 Flynn et al. ................ 395/600
5,357,509 A 10/1994 Ohizumi .................... 371/10.1
5,367,682 A 11/1994 Chang ........................ 395/700
5,375,232 A 12/1994 Legvold et al. ............. 395/575
5,390,313 A 2/1995 Yanai et al. ................ 395/425
5,404,361 A 4/1995 Casorso et al. ............ 371/40.1
5,430,866 A 7/1995 Lawrence et al. .......... 395/575
5,430,885 A 7/1995 Kaneko et al. ............. 395/800
5,432,922 A 7/1995 Polyzois et al. ............ 395/425
5,435,004 A 7/1995 Cox et al. ................... 395/575
5,452,420 A 9/1995 Engdahl et al. ............ 395/285
5,479,615 A 12/1995 Ishii et al. .................. 395/250
5,481,701 A 1/1996 Chambers, IV ............. 395/600
5,495,601 A 2/1996 Narang et al. .............. 395/600
5,497,483 A 3/1996 Beardsley et al. .......... 395/575
5,504,882 A 4/1996 Chai et al. ............. 395/182.03
5,519,844 A 5/1996 Stallmo ...................... 395/441
5,522,046 A 5/1996 McMillen et al. ..... 395/200.15
5,528,759 A 6/1996 Moore .................. 395/200.11
5,530,845 A 6/1996 Hiatt et al. ................ 395/500
5,537,533 A 7/1996 Staheli et al. .......... 395/182.03
5,544,347 A 8/1996 Yanai et al. ................ 395/489
5,546,535 A 8/1996 Stallmo et al. ........ 395/182.07
5,546,556 A 8/1996 Matsushita .................. 395/427
5,559,958 A 9/1996 Farrand et al. ........ 395/183.03
5,561,815 A 10/1996 Takata et al. ............... 395/833
5,566,316 A 10/1996 Fechner et al. ............. 395/441
5,568,628 A 10/1996 Satoh et al. ................ 395/440
5,568,629 A 10/1996 Gentry et al. ............... 395/441
5,583,994 A 12/1996 Rangan ................ 395/200.09
5,596,736 A 1/1997 Kerns ......................... 395/404
5,611,069 A 3/1997 Matoba ...................... 395/441
5,619,694 A 4/1997 Shimazu ..................... 395/615
5,625,818 A 4/1997 Zarmer et al. .............. 395/615
5,659,787 A 8/1997 Schieltz ................ 395/200.56
5,664,144 A 9/1997 Yanai et al. ................ 711/113
5,671,439 A 9/1997 Klein et al. ................. 395/821
5,673,322 A 9/1997 Pepe et al. .................... 380/49
5,673,382 A 9/1997 Cannon et al. ........ 395/182.04
5,680,580 A 10/1997 Beardsley et al. .......... 395/489
5,684,945 A 11/1997 Chen et al. ............ 395/182.18
5,692,155 A 11/1997 Iskiyan et al. .............. 395/489
5,710,885 A 1/1998 Bondi .................. 395/200.54
5,710,918 A 1/1998 Lagarde et al. ............. 395/610
5,715,393 A 2/1998 Naugle ................. 395/200.11
5,719,942 A 2/1998 Aldred et al. ................. 380/49
5,720,027 A 2/1998 Sarkozy et al. ........ 395/182.04
5,732,238 A 3/1998 Sarkozy ...................... 395/440
5,737,743 A 4/1998 Ooe et al. ................... 711/112
5,740,397 A 4/1998 Levy ......................... 395/441
5,742,792 A 4/1998 Yanai et al. ................ 395/489
5,745,789 A 4/1998 Kakuta ....................... 395/841
5,748,897 A 5/1998 Katiyar ................. 395/200.49
5,761,410 A 6/1998 Martin et al. .......... 395/183.18
5,761,507 A 6/1998 Govett ....................... 395/684
5,764,913 A 6/1998 Jancke et al. .......... 395/200.54
5,765,186 A 6/1998 Searby ....................... 711/100
5,765,204 A 6/1998 Bakke et al. ............... 711/202
5,768,623 A 6/1998 Judd et al. .................. 395/857
5,771,367 A 6/1998 Beardsley et al. .......... 395/489
5,774,655 A 6/1998 Bloem et al. ............ 395/200.5
5,774,680 A 6/1998 Wanner et al. .............. 395/290
5,784,703 A 7/1998 Muraoka et al. ............ 711/173
5,787,304 A 7/1998 Hodges et al. .............. 395/821
5,787,459 A 7/1998 Stallmo et al. ............. 711/112
5,787,470 A 7/1998 DeSimone et al. ......... 711/124
5,787,485 A 7/1998 Fitzgerald, V et al. ..... 711/162
5,790,774 A 8/1998 Sarkozy ................. 395/182.04
5,805,919 A 9/1998 Anderson ................... 395/821
5,809,328 A 9/1998 Noagles et al. ............. 395/825
5,809,332 A 9/1998 Vishlitzky et al. .......... 395/835
5,812,754 A 9/1998 Lui et al. ............... 395/182.04
5,812,784 A 9/1998 Watson et al. ......... 395/200.57
5,819,020 A 10/1998 Beeler, Jr. .............. 395/182.03
5,828,475 A 10/1998 Bennett et al. ............. 359/139
5,828,820 A 10/1998 Onishi et al. .......... 395/182.04
5,832,088 A 11/1998 Nakajima et al. ............. 380/22
5,835,718 A 11/1998 Blewett ................. 395/200.48
5,835,764 A 11/1998 Platt et al. .................. 395/671
5,842,224 A 11/1998 Fenner ....................... 711/202
5,848,251 A 12/1998 Lomelino et al. ........... 395/309
5,850,522 A 12/1998 Wlaschin ............... 395/200.45
5,852,715 A 12/1998 Raz et al. .............. 395/200.31
5,857,208 A 1/1999 Ofek .......................... 707/204
5,857,213 A 1/1999 Benhase et al. ............ 711/112
5,873,125 A 2/1999 Kawamoto .................. 711/202
5,889,935 A 3/1999 Ofek et al. ............ 395/182.04
5,893,919 A 4/1999 Sarkozy et al. ............. 711/114
5,894,554 A 4/1999 Lowery et al. ........ 395/200.33
5,897,661 A 4/1999 Baranovsky et al. ........ 711/170
5,901,280 A 5/1999 Mizuno et al. ........ 395/182.04
5,901,327 A 5/1999 Ofek .......................... 395/825
5,909,692 A 6/1999 Yanai et al. .................... 711/4
5,911,150 A 6/1999 Peterson et al. ............ 711/162
5,911,779 A 6/1999 Stallmo et al. ................ 714/6
5,912,897 A 6/1999 Steinbach ................... 370/467
5,926,833 A 7/1999 Rasoulian et al. .......... 711/147
5,933,614 A 8/1999 Tavallaei et al. ............ 395/309
5,933,653 A 8/1999 Ofek .......................... 395/826
5,940,865 A 8/1999 Ohzora et al. .............. 711/167
5,941,972 A 8/1999 Hoese et al. ............... 710/129
5,948,108 A 9/1999 Lu et al. ........................ 714/4
5,956,750 A 9/1999 Yamamoto et al. ......... 711/167
5,959,994 A 9/1999 Boggs et al. ............... 370/399
5,960,216 A 9/1999 Vishlitzky et al. .......... 395/894
5,961,593 A 10/1999 Gabber et al. .............. 709/219
5,969,841 A 10/1999 McGinley et al. .......... 359/163
5,974,566 A 10/1999 Ault et al. .................... 714/15
5,978,890 A 11/1999 Ozawa et al. ............... 711/163
5,983,316 A 11/1999 Norwood .................... 711/112
5,987,627 A 11/1999 Rawlings, III ............... 714/48
6,003,030 A 12/1999 Kenner et al. ................ 707/10
6,003,065 A 12/1999 Yan et al. ................... 709/201
6,006,017 A 12/1999 Joshi et al. ............ 395/200.11
6,009,478 A 12/1999 Panner et al. .................. 710/5
6,012,120 A 1/2000 Duncan et al. ............. 710/129
6,014,676 A 1/2000 McClain ..................... 707/204
6,014,731 A 1/2000 Totsuka et al. ............. 711/202
6,021,436 A 2/2000 Garrett ...................... 709/224
6,029,000 A 2/2000 Woolsey et al. ............ 395/705
6,038,379 A 3/2000 Fletcher et al. .......... 395/200.6
6,038,630 A 3/2000 Foster et al. ................ 710/132
6,041,381 A 3/2000 Hoese ........................ 710/129
6,044,081 A 3/2000 Bell et al. ................... 370/401
6,047,350 A 4/2000 Dutton et al. ............... 710/129
6,049,819 A 4/2000 Buckle et al. .............. 709/202
6,049,828 A 4/2000 Dev et al. ................... 709/224
6,052,727 A 4/2000 Kamalanathan ............. 709/224
6,052,736 A 4/2000 Ogle et al. .................. 709/244
6,052,759 A 4/2000 Stallmo et al. ............. 711/114
6,052,797 A 4/2000 Ofek et al. .................... 714/6
6,055,602 A 4/2000 McIlvain et al. ........... 711/112
6,057,863 A 5/2000 Olarig ........................ 345/520
6,061,356 A 5/2000 Terry ......................... 370/401
6,061,687 A 5/2000 Wooten ...................... 707/101
6,063,128 A 5/2000 Bentley et al. ................ 703/6
6,065,085 A 5/2000 Odenwald, Jr. et al. .... 710/129
6,065,087 A 5/2000 Keaveny et al. ............ 710/129
6,065,096 A 5/2000 Day et al. ................... 711/114
6,065,100 A 5/2000 Schafer et al. .............. 711/137

| | | | | |
|---|---|---|---|---|
| 6,066,181 | A | 5/2000 | DeMaster | 717/5 |
| 6,073,209 | A | 6/2000 | Bergsten | 711/114 |
| 6,073,222 | A | 6/2000 | Ohran | 711/162 |
| 6,081,834 | A | 6/2000 | Brandt et al. | 709/213 |
| 6,085,193 | A | 7/2000 | Malkin et al. | 707/10 |
| 6,098,128 | A | 8/2000 | Velez-McCaskey et al. | 710/65 |
| 6,098,146 | A | 8/2000 | Bouvier et al. | 711/100 |
| 6,101,497 | A | 8/2000 | Ofek | 707/10 |
| 6,148,412 | A | 11/2000 | Cannon et al. | 714/6 |
| 6,393,535 | B1 * | 5/2002 | Burton et al. | 711/158 |
| 6,587,959 | B1 * | 7/2003 | Sjolander et al. | 714/4 |
| 6,633,962 | B1 * | 10/2003 | Burton et al. | 711/163 |
| 6,640,278 | B1 * | 10/2003 | Nolan et al. | 711/6 |
| 6,654,830 | B1 * | 11/2003 | Taylor et al. | 710/74 |
| 2002/0029319 | A1 * | 3/2002 | Robbins et al. | 711/114 |
| 2003/0115324 | A1 * | 6/2003 | Blumenau et al. | 709/225 |

FOREIGN PATENT DOCUMENTS

| | | | |
|---|---|---|---|
| WO | WO 92/18931 | 10/1992 | G06F 11/20 |
| WO | WO 0000889 A | 1/2000 | |
| WO | WO 0029954 A | 5/2000 | |

OTHER PUBLICATIONS

Robertson, Bruce, "New Products Make Replication Easier: An Analysis," Network Computing, The Gale Group, Sep. 1993, p. 99.

Lawrence, Andrew, "Remote Disks: The evolution of remote disk support over public lines means that disk can now be located thousands of kilometers away from the central processor," The Gale Group, IBM System User, vol. 14, No. 2, Feb. 1993, p. 14.

Bobrowski, Steve, "Protecting your data: Overview and Comparison of Backup and Recovery Features in Database Servers," The Gale Group, DBMS, vol. 6, No. 8, Jul., 1993, p. 55.

Patent Abstracts of Japan, Patent No. JP63010286, published Jan. 16, 1988.

Copy of International Search Report issued Aug. 27, 2001 for PCT/US00/32493, 8 pages.

Vekiarides, Nicos "Fault-Tolerant Disk Storage and File Systems Using Reflective Memory," IEEE, Proceedings of the 28th Annual Hawaii International Conference on System Sciences, 1995, pp. 103-113.

Vekiarides, Nicos, "Implementation of a Fault-Tolerant Disk Storage System Using Reflective Memory," date and publisher unknown, pp. 1-28.

"Program for Exporting Transmission Control Protocol-Based Services through Firewalls," IBM Corp., IBM® Technical Disclosure Bulletin, vol. 40, No. 12, Dec. 1997, pp. 161-162.

"Product Brief- May 2000: StorageApps' SAN Appliance," The Enterprise Storage Group, 2000, pp. 1-3.

"Enterprise Storage Report: Technical Review," Enterprise Storage Group, www.enterprisestoragegroup.com, vol. 6, date unknown, 5 pages.

Christensen, Brenda, "Building a Storage-Area Network: SANs Boost Performance, Reliability, and Scalability of the Critical Link Between Servers and Storage Devices," Data Communications, Apr. 21, 1998, pp. 67-71.

Jander, Mary, "Launching a Storage-Area Net: High-Speed Storage-Area Networks Help Net Managers Hurl Stored Data Around Quickly- and Take the Load off the LAN and WAN," Data Communications, Mar. 21, 1998, pp. 64-72.

Press Release, HP's High-Speed I/O Business Unit, Hewlett Packard, Aug. 1997, 3 pages.

Press Release, "HP's TACHYON Fibre Channel Controller Chosen by Compaq: Industry-Leading IC to Enable Next-Generation Storage Solutions," Hewlett Packard, Aug. 6, 1997, 2 pages.

Press Release, "HP's TACHYON Family of Fibre Channel Protocol Controllers to be Part of Compaq's Next-Generation Storage Solutions," Hewlett Packard, Dec. 7, 1998, 2 pages.

Mace, Scott, "Serving Up Storage," The McGraw-Hill Companies, Inc., BYTE, vol. 23, No. 1, Jan. 1998, p. 72.

Kennedy, Carla, "Fibre Channel Speeds the Convergence of Network and Storage," Storage Management Solutions, Nov. 1997, pp. 28-31.

Fleming, Vincent, "Raid in Clusters," Storage Management Solutions, Mar. 1998, pp. 51-53.

Smith, Brian R., "How Will Migrating To Fibre Channel Occur?" Computer Technology Review, date unknown, pp. 92, 94, 95.

Snively, Robert, "SCSI applications on Fibre Channel," High-Speed Fiber Networks and channels II, The Society of Photo-Optical Instrumentation Engineers, Proceedings SPIE- The International Society for Optical Engineering, Sep. 8-9, 1992, vol. 1784, pp. 104-113.

Copy of International Search Report issued Oct. 9, 2001 for PCT/US00/42337, 7 pages.

Bannister, Dick, "Compaq Storage Resource Manager," Evaluator Group Inc., Storage News, vol. 2, Issue 4, Apr. 2000.

* cited by examiner

METHOD AND SYSTEM OF ALLOCATING STORAGE RESOURCES IN A STORAGE AREA NETWORK

CROSS-REFERENCE TO OTHER APPLICATIONS

The following applications of common assignee are related to the present application, and are herein incorporated by reference in their entireties:

"Internet Protocol Data Mirroring," Ser. No. 09/664,499, filed concurrently herewith.

"Method, System, and Computer Program Product for Managing Storage Resources," Ser. No. 09/664,314, filed concurrently herewith.

"Method, System, and Computer Program Product for a Data Propagation Platform and Applications of Same," Ser. No. 09/665,583, filed concurrently herewith.

BACKGROUND OF THE INVENTION

1. Field of the Invention

The invention relates generally to the field of storage area networks, and more particularly to the allocation of storage in storage area networks.

2. Related Art

Traditional approaches exist for providing access to data in computer networks. These approaches generally fall into one of two categories: host-based and storage-based. Host-based approaches include those where storage management functionality is loaded and operated from the host (server). Storage-based solutions are those where storage management functionality is loaded and operated from a storage array controller (or similar device).

Host-based approaches typically focus on application servers that run critical applications. For example, an application server may execute trading calculations for a trading room floor. Application servers are typically expensive, and are essential to a user's daily operations. Host-based storage solutions that run on application servers require processor cycles, and thus have a negative effect on the performance of the application server.

Additionally, host-based solutions suffer from difficulties in managing software and hardware interoperability in a multi-platform environment. Some of these difficulties include: managing separate licenses for each operating system; training system administrators on the various operating systems and host-based software; managing upgrades of operating systems; and managing inter-host dependencies when some functionality needs to be altered.

Storage-based solutions suffer from many of the same drawbacks. When storage-based solutions are provided with a disk array controller, compatibility between primary and target storage sites may become an issue. This compatibility problem may require a user to obtain hardware and software from the same provider or vendor. Moreover, hardware and software compatibility may also be limited to a particular range of versions provided by the vendor. Hence, if another vendor develops superior disk technology or connectivity solutions, a user may have difficulty introducing them into their existing environment.

Storage area networks (SANs) have been developed as a more recent approach to providing access to data in computer networks, to address some of the above concerns. A SAN is a network linking servers or workstations to storage devices. A SAN is intended to increase the pool of storage available to each server in the computer network, while reducing the data supply demand on servers. Conventional SANs, however, still may suffer from some of the above discussed problems, and some of their own.

For example, SANs may also suffer from problems associated with storage allocation. One problem relates to determining how to present the storage itself. For instance, it must be determined which storage devices shall be designated to provide storage for which servers. A further problem relates to storage security. It may be difficult for a SAN administrator to restrict access by certain servers to particular storage modules, while allowing other servers to access them. SAN administrators also have to confront the difficulty of coordinating networks that include a wide variety of different storage device types and manufactures, communication protocols, and other variations.

Therefore, in view of the above, what is needed is a system, method and computer program product for allocating storage in a storage area network. Furthermore, what is needed is a system, method and computer program product for allocating storage in a storage area network while maintaining storage security. Still further, what is needed is a system, method and computer program product for allocating storage from a variety of storage device types, manufactures, and interfaces in a storage area network.

SUMMARY OF THE INVENTION

The present invention is directed to a system for allocating storage resources in a storage area network. A logical unit number (LUN) mapper receives at least one storage request parameter and maps the storage request parameters to at least one physical LUN. The LUN mapper includes at least one LUN map. The storage request parameters include a host id parameter, a target LUN parameter, and a target host bus adaptor (HBA) parameter. The LUN mapper uses the host id parameter to select the one of the LUN maps that corresponds to the host id parameter. The LUN mapper applies the target LUN parameter and the target HBA parameter to the selected LUN map to locate the physical LUN(s) stored in the selected LUN map. The LUN mapper issues the received read/write storage request to at least one storage device that houses the physical LUN(s). The one or more storage devices are located in the storage area network.

In a further aspect of the present invention, a method for allocating storage in a storage area network is provided. A read/write storage request is received from a host computer. The read/write storage request is resolved. A physical LUN is determined from the resolved read/write storage request. A read/write storage request is issued to a storage device in a storage area network. The storage device corresponds to the determined physical LUN.

Further aspects of the present invention, and further features and benefits thereof, are described below. The accompanying drawings, which are incorporated herein and form a part of the specification, illustrate the present invention and, together with the description, further serve to explain the principles of the invention and to enable a person skilled in the pertinent art to make and use the invention.

BRIEF DESCRIPTION OF THE FIGURES

In the drawings, like reference numbers indicate identical or functionally similar elements. Additionally, the left-most digit(s) of a reference number identifies the drawing in which the reference number first appears.

The present invention will now be described with reference to the accompanying drawings.

DETAILED DESCRIPTION OF THE PREFERRED EMBODIMENTS

Overview

The present invention is directed to a method and system of allocating resources in a storage area network (SAN). The invention allocates storage resources in a SAN by mapping logical unit numbers (LUNs) representative of the storage resources to individual hosts, thereby allowing dynamic management of storage devices and hosts in the SAN. According to the present invention, each mapped LUN can be unique to a particular host or shared among different hosts.

Figure 1:
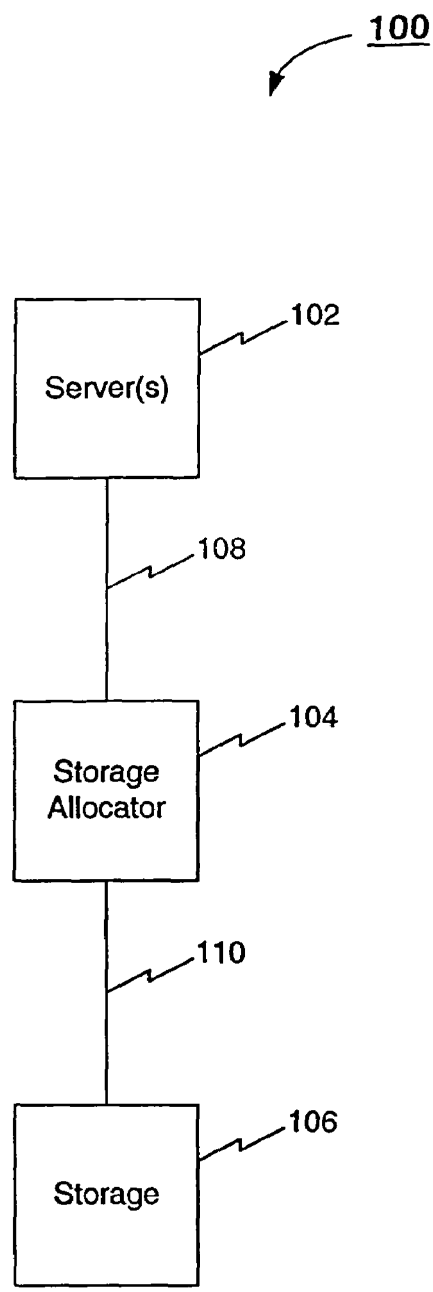
FIG. 1 illustrates a block diagram of an example storage allocator network configuration, according to embodiments of the present invention.

FIG. 1 illustrates a block diagram of an example network configuration 100, according to embodiments of the present invention. Network configuration 100 comprises server(s) 102, a storage allocator 104, and storage 106. Generally, storage allocator 104 receives data I/O requests from server(s) 102, maps the data I/O requests to physical storage I/O requests, and forwards them to storage 106.

Server(s) 102 includes one or more hosts or servers that may be present in a data communication network. Server(s) 102 manage network resources. For instance, one or more of the servers of server(s) 102 may be file servers, network servers, application servers, database servers, or other types of server. Server(s) 102 may comprise single processor or multi-processor servers. Server(s) 102 process requests for data and applications from networked computers, workstations, and other peripheral devices otherwise known or described elsewhere herein. Server(s) 102 output requests to storage allocator 104 to write to, or read data from storage 106.

Storage allocator 104 receives storage read and write requests from server(s) 102 via first communications link 108. The storage read and write requests include references to one or more locations in a logical data space recognized by the requesting host. Storage allocator 104 parses the storage read and write requests by extracting various parameters that are included in the requests. In an embodiment, each storage read and write request from the host includes a host id, a target HBA (host bus adaptor), and a target LUN. Generally, a LUN corresponds to a label for a subunit of storage on a target storage device (virtual or actual), such as a disk drive. Storage allocator 104 uses the parsed read and write request to determine physical storage locations corresponding to the target locations in the logical data space. In a preferred embodiment, one or more LUN maps in storage allocator 104 are used to map the virtual data locations to physical locations in storage 106. Storage allocator 104 outputs read and write requests to physical storage/LUNs.

First communications link 108 may be an Ethernet link, a fibre channel link, a SCSI link, or other applicable type of communications link otherwise known or described elsewhere herein.

Storage 106 receives storage read and write requests from storage allocator 104 via second communications link 110. Storage 106 routes the received physical storage read and write requests to the corresponding storage device(s), which respond by reading or writing data as requested. Storage 106 comprises one or more storage devices that may be directly coupled to storage allocator 104, and/or may be interconnected in a storage area network configuration that is coupled to storage allocator 104. For example, storage 106 may comprise one or more of a variety of storage devices, including tape systems, JBODs (Just a Bunch Of Disks), floppy disk drives, optical disk drives, disk arrays, and other applicable types of storage devices otherwise known or described elsewhere herein. Storage devices in storage 106 may be interconnected via SCSI and fibre channel links, and other types of links, in a variety of topologies. Example topologies for storage 106 are more fully described below.

Second communications link 110 may be an Ethernet link, fibre channel link, a SCSI link, or other applicable type of communications link otherwise known or described elsewhere herein.

According to the present invention, available storage is partitioned without any regard necessarily to the physical divisions of storage devices, and the partitions are stored in the LUN maps. These partitions are referred to as virtual or target LUNs. Portions of, or all of available physical storage may be partitioned and presented as virtual LUNs. Each host may be presented different portions of physical storage via the LUN maps, and/or some hosts may be presented with the same or overlapping portions. LUN maps allow the storage allocator of the present invention to make available a set of storage to a host, that may overlap or be completely independent from that made available to another host.

The virtual LUN configurations are stored in storage allocator 104 in LUN maps corresponding to each host. A LUN map may be chosen, and then used to convert virtual storage read or write requests by the respective host to an actual physical storage location. Embodiments for the storage allocator 104 of the present invention are described in further detail below.

Description in these terms is provided for convenience only. It is not intended that the invention be limited to application in this example environment. In fact, after reading the following description, it will become apparent to a person skilled in the relevant art how to implement the invention in alternative environments known now or developed in the future. Further detailed embodiments of the elements of network configuration 100 are discussed below.

Terminology related to the present invention is described in the following subsection. Next, an example storage area network environment is described, in which the present invention may be applied. Detailed embodiments of the storage allocator of the present invention are presented in the subsequent subsection, followed by exemplary storage area network implementations of the storage allocator. Finally, an exemplary computer system in which the present invention may be implemented is then described.

Terminology

To more clearly delineate the present invention, an effort is made throughout the specification to adhere to the following term definitions as consistently as possible.

Arbitrated Loop A shared 100 MBps Fibre Channel transport supporting up to 126 devices and 1 fabric attachment.

Fabric One or more Fibre Channel switches in a networked topology.

HBA Host bus adapter; an interface between a server or workstation bus and a Fibre Channel network.

Hub In Fibre Channel, a wiring concentrator that collapses a loop topology into a physical star topology.

Initiator On a Fibre Channel network, typically a server or a workstation that initiates transactions to disk or tape targets.

JBOD Just a bunch of disks; typically configured as an Arbitrated Loop segment in a single chassis.

LAN Local area network; a network linking multiple devices in a single geographical location.

Logical Unit The entity within a target that executes I/O commands. For example, SCSI I/O commands are sent to a target and executed by a logical unit within that target. A SCSI physical disk typically has a single logical unit. Tape drives and array controllers may incorporate multiple logical units to which I/O commands can be addressed. Typically, each logical unit exported by an array controller corresponds to a virtual disk.

LUN Logical Unit Number; The identifier of a logical unit within a target, such as a SCSI identifier.

Point-to-point A dedicated Fibre Channel connection between two devices.

Private loop A free-standing Arbitrated Loop with no fabric attachment.

Public loop An Arbitrated Loop attached to a fabric switch.

RAID Redundant Array of Independent Disks.

SCSI Small Computer Systems Interface; both a protocol for transmitting large blocks of data and a parallel bus architecture.

SCSI-3 A SCSI standard that defines transmission of SCSI protocol over serial links.

Storage Any device used to store data; typically, magnetic disk media or tape.

Switch A device providing full bandwidth per port and high-speed routing of data via link-level addressing.

Target Typically a disk array or a tape subsystem on a Fibre Channel network.

Topology The physical or logical arrangement of devices in a networked configuration.

WAN Wide area network; a network linking geographically remote sites.

Example Storage Area Network Environment

In a preferred embodiment, the present invention is applicable to storage area networks. As discussed above, a storage area network (SAN) is a high-speed sub-network of shared storage devices. A SAN operates to provide access to the shared storage devices for all servers on a local area network (LAN), wide area network (WAN), or other network coupled to the SAN. SAN attached storage (SAS) elements connect directly to the SAN, and provide file, database, block, or other types of data access services. SAS elements that provide such file access services are commonly called Network Attached Storage, or NAS devices. A SAN configuration potentially provides an entire pool of available storage to each network server, eliminating the conventional dedicated connection between server and disk. Furthermore, because a server's mass data storage requirements are fulfilled by the SAN, the server's processing power is largely conserved for the handling of applications rather than the handling of data requests.

Figure 8:
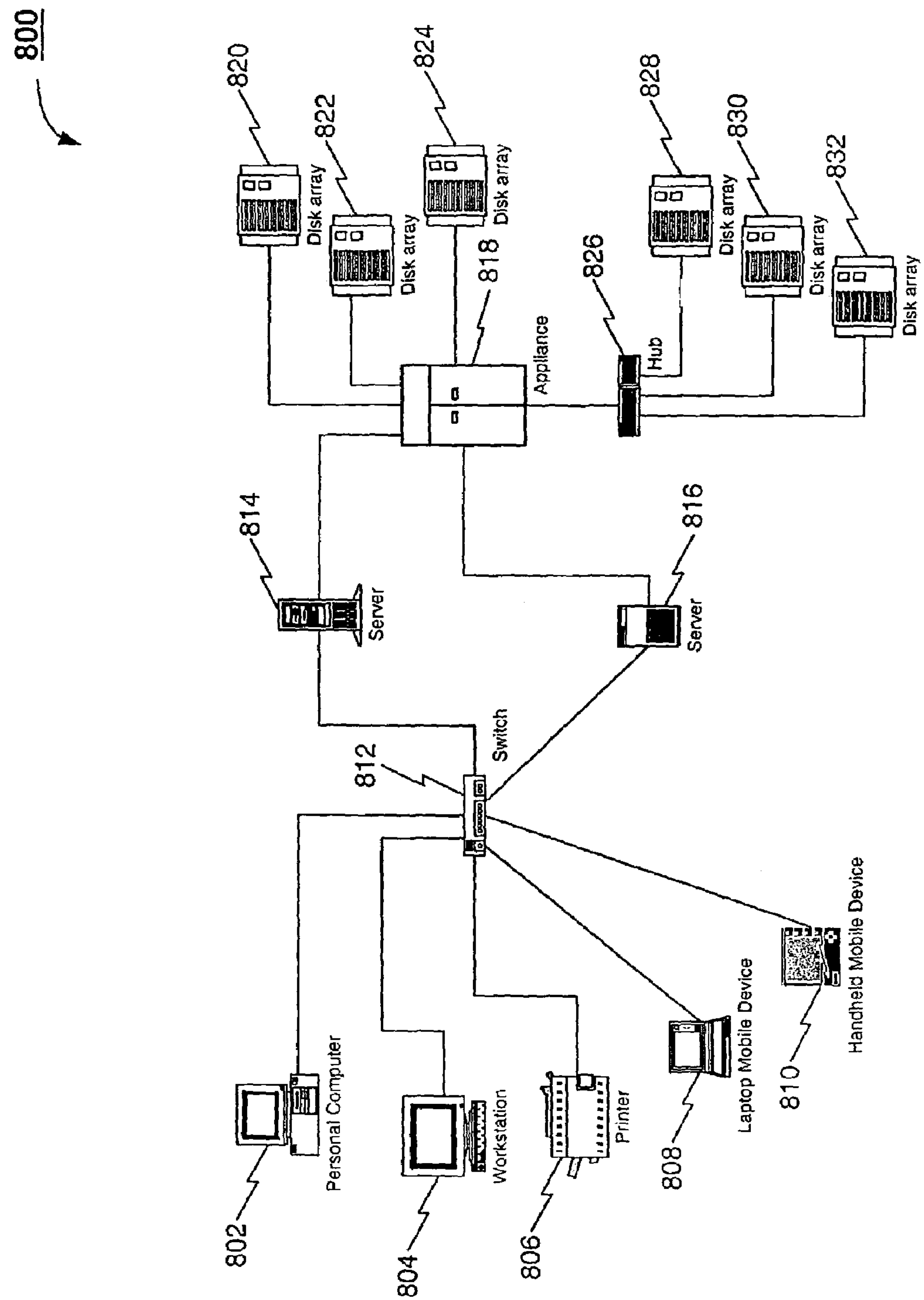
FIG. 8 illustrates an example data communication network, according to an embodiment of the present invention.

FIG. 8 illustrates an example data communication network 800, according to an embodiment of the present invention. Network 800 includes a variety of devices which support communication between many different entities, including businesses, universities, individuals, government, and financial institutions. As shown in FIG. 8, a communication network, or combination of networks, interconnects the elements of network 800. Network 800 supports many different types of communication links implemented in a variety of architectures.

Network 800 may be considered to be an example of a storage area network that is applicable to the present invention. Network 800 comprises a pool of storage devices, including disk arrays 820, 822, 824, 828, 830, and 832. Network 800 provides access to this pool of storage devices to hosts/servers comprised by or coupled to network 800. Network 800 may be configured as point-to-point, arbitrated loop, or fabric topologies, or combinations thereof.

Network 800 comprises a switch 812. Switches, such as switch 812, typically filter and forward packets between LAN segments. Switch 812 may be an Ethernet switch, fast-Ethernet switch, or another type of switching device known to persons skilled in the relevant art(s). In other examples, switch 812 may be replaced by a router or a hub. A router generally moves data from one local segment to another, and to the telecommunications carrier, such as AT&T or WorldCom, for remote sites. A hub is a common connection point for devices in a network. Suitable hubs include passive hubs, intelligent hubs, and switching hubs, and other hub types known to persons skilled in the relevant art(s).

Various types of terminal equipment and devices may interface with network 800. For example, a personal computer 802, a workstation 804, a printer 806, a laptop mobile device 808, and a handheld mobile device 810 interface with network 800 via switch 812. Further types of terminal equipment and devices that may interface with network 800 may include local area network (LAN) connections (e.g., other switches, routers, or hubs), personal computers with modems, content servers of multi-media, audio, video, and other information, pocket organizers, Personal Data Assistants (PDAs), cellular phones, Wireless Application Protocol (WAP) phones, and set-top boxes. These and additional types of terminal equipment and devices, and ways to interface them with network 800, will be known by persons skilled in the relevant art(s) from the teachings herein.

Network 800 includes one or more hosts or servers. For example, network 800 comprises server 814 and server 816. Servers 814 and 816 provide devices 802, 804, 806, 808, and 810 with network resources via switch 812. Servers 814 and 816 are typically computer systems that process end-user requests for data and/or applications. In one example configuration, servers 814 and 816 provide redundant services. In another example configuration, server 814 and server 816 provide different services and thus share the processing load needed to serve the requirements of devices 802, 804, 806, 808, and 810. In further example configurations, one or both of servers 814 and 816 are connected to the Internet, and thus server 814 and/or server 816 may provide Internet access to network 800. One or both of servers 814 and 816 may be Windows NT servers or UNIX servers, or other servers known to persons skilled in the relevant art(s).

A SAN appliance or device as described elsewhere herein may be inserted into network 800, according to embodiments of the present invention. For example, a SAN appliance 818 may to implemented to provide the required connectivity between the storage device networking (disk arrays 820, 822, 824, 828, 830, and 832) and hosts and servers 814 and 816, and to provide the additional functionality of the storage allocator of the present invention described elsewhere herein.

Network 800 includes a hub 826. Hub 826 is connected to disk arrays 828, 830, and 832. Preferably, hub 826 is a fibre channel hub or other device used to allow access to data stored on connected storage devices, such as disk arrays 828, 830, and 832. Further fibre channel hubs may be cascaded with hub 826 to allow for expansion of the SAN, with additional storage devices, servers, and other devices. In an example configuration for network 800, hub 826 is an arbitrated loop hub. In such an example, disk arrays 828, 830, and 832 are organized in a ring or loop topology, which is collapsed into a physical star configuration by hub 826. Hub 826 allows the loop to circumvent a disabled or disconnected device while maintaining operation.

Network 800 may include one or more switches in addition to switch 812 that interface with storage devices. For example, a fibre channel switch or other high-speed device may be used to allow servers 814 and 816 access to data stored on connected storage devices, such as disk arrays 820, 822, and 824, via appliance 818. Fibre channel switches may be cascaded to allow for the expansion of the SAN, with additional storage devices, servers, and other devices.

Disk arrays 820, 822, 824, 828, 830, and 832 are storage devices providing data and application resources to servers 814 and 816 through appliance 818 and hub 826. As shown in FIG. 8, the storage of network 800 is principally accessed by servers 814 and 816 through appliance 818. The storage devices may be fibre channel-ready devices, or SCSI (Small Computer Systems Interface) compatible devices, for example. Fibre channel-to-SCSI bridges may be used to allow SCSI devices to interface with fibre channel hubs and switches, and other fibre channel-ready devices. One or more of disk arrays 820, 822, 824, 828, 830, and 832 may instead be alternative types of storage devices, including tape systems, JBODs (Just a Bunch Of Disks), floppy disk drives, optical disk drives, and other related storage drive types.

The topology or architecture of network 800 will depend on the requirements of the particular application, and on the advantages offered by the chosen topology. One or more hubs 826, one or more switches, and/or one or more appliances 818 may be interconnected in any number of combinations to increase network capacity. Disk arrays 820, 822, 824, 828, 830, and 832, or fewer or more disk arrays as required, may be coupled to network 800 via these hubs 826, switches, and appliances 818.

Figure 9:
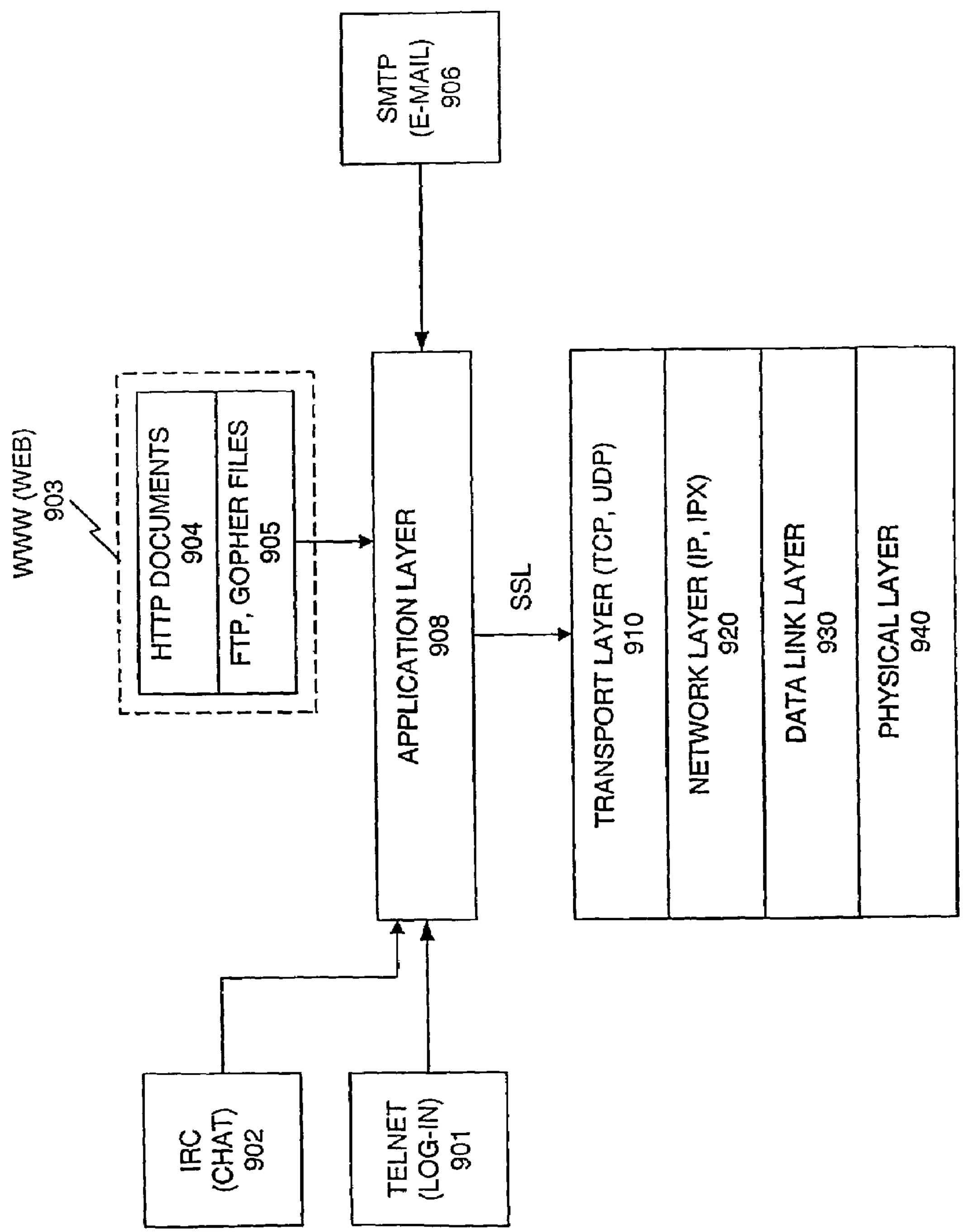
FIG. 9 shows a simplified five-layered communication model, based on an Open System Interconnection (OSI) reference model.

Communication over a communication network, such as shown in network 800 of FIG. 8, is carried out through different layers. FIG. 9 shows a simplified five-layered communication model, based on Open System Interconnection (OSI) reference model. As shown in FIG. 9, this model includes an application layer 908, a transport layer 910, a network layer 920, a data link layer 930, and a physical layer 940. As would be apparent to persons skilled in the relevant art(s), any number of different layers and network protocols may be used as required by a particular application.

Application layer 908 provides functionality for the different tools and information services which are used to access information over the communications network. Example tools used to access information over a network include, but are not limited to Telnet log-in service 901, IRC chat 902, Web service 903, and SMTP (Simple Mail Transfer Protocol) electronic mail service 906. Web service 903 allows access to HTTP documents 904, and FTP (File Transfer Protocol) and Gopher files 905. Secure Socket Layer (SSL) is an optional protocol used to encrypt communications between a Web browser and Web server.

Transport layer 910 provides transmission control functionality using protocols, such as TCP, UDP, SPX, and others, that add information for acknowledgments that blocks of the file had been received.

Network layer 920 provides routing functionality by adding network addressing information using protocols such as IP, IPX, and others, that enable data transfer over the network.

Data link layer 930 provides information about the type of media on which the data was originated, such as Ethernet, token ring, or fiber distributed data interface (FDDI), and others.

Physical layer 940 provides encoding to place the data on the physical transport, such as twisted pair wire, copper wire, fiber optic cable, coaxial cable, and others.

Description of this example environment in these terms is provided for convenience only. It is not intended that the invention be limited to application in this example environment. In fact, after reading the description herein, it will become apparent to persons skilled in the relevant art(s) how to implement the invention in alternative environments. Further details on designing, configuring, and operating storage area networks are provided in Tom Clark, "Designing Storage Area Networks: A Practical Reference for Implementing Fibre Channel SANs" (1999), which is incorporated herein by reference in its entirety.

Storage Allocator Embodiments

Structural implementations for the storage allocator of the present invention are described at a high-level and at a more detailed level. These structural implementations are described herein for illustrative purposes, and are not limiting. In particular, the present invention as described herein can be achieved using any number of structural implementations, including hardware, firmware, software, or any combination thereof. For instance, the present invention as described herein may be implemented in a computer system, application-specific box, or other device. In an embodiment, the present invention may be implemented in a SAN appliance, which provides for an interface between host servers and storage. Such SAN appliances include the SANLink™ appliance, developed by StorageApps Inc., located in Bridgewater, N.J.

Storage allocator 104 provides the capability to disassociate the logical representation of a disk (or other storage device) as presented to a host from the physical components that make up the logical disk. Specifically, the storage allocator of the present invention has the ability to change a LUN as presented to the server from the storage (a process also referred to as "LUN mapping," which involves mapping physical space to give a logical view of the storage). In an embodiment, LUN mapping works by assigning each host with a separate LUN map. For each incoming command, SCSI or otherwise, the system identifies the host, target host bus adapter (HBA), and target LUN. The system uses that information to convert the received virtual or target LUN to an actual or physical LUN, via a LUN map.

Through such LUN mapping, a host can be presented with any size storage pool that is required to meet changing needs. For example, multiple physical LUNs can be merged into a single storage image for a host (i.e., storage "expansion"). All connected storage units can be presented to a host as a single storage pool irrespective of storage area network topology. The result is that any storage subsystem (for example, SCSI or Fibre Channel) can be connected to any host (for example, UNIX or NT). Alternatively, physical LUNs can be partitioned into multiple images for a host (i.e., storage "partitioning").

Storage allocation through LUN mapping provides a number of desirable storage functions, including the following:

Partitioning: Through LUN mapping, a user may present a virtual device that is physically a partition of a larger device. Each partition appears to one or more hosts to be an actual physical device. These partitions may be used to share storage from a single disk (or other storage device) across multiple host operating systems.

Expansion: Through LUN mapping, a user may present a virtual device consisting of multiple merged physical LUNs, creating an image of an expanded LUN to the outside world. Thus, for example, the user may consolidate both SCSI and Fibre Channel storage systems into the same global storage pool.

Security: The user may also manage access to storage via a LUN map "mask", which operates to limit the LUN(s) that a host sees. This masking may be used to prohibit a host from accessing data that it does not have permission to access.

In embodiments, the storage allocator of the present invention is based independently of a host. Unlike host-based solutions, which simply mask storage resources and require additional software on every host in the network, the present invention requires no additional software, hardware, or firmware on host machines. The present invention is supported by all platforms and all operating systems. Furthermore, host machines may be added to the network seamlessly, without disruption to the network.

Figure 2:
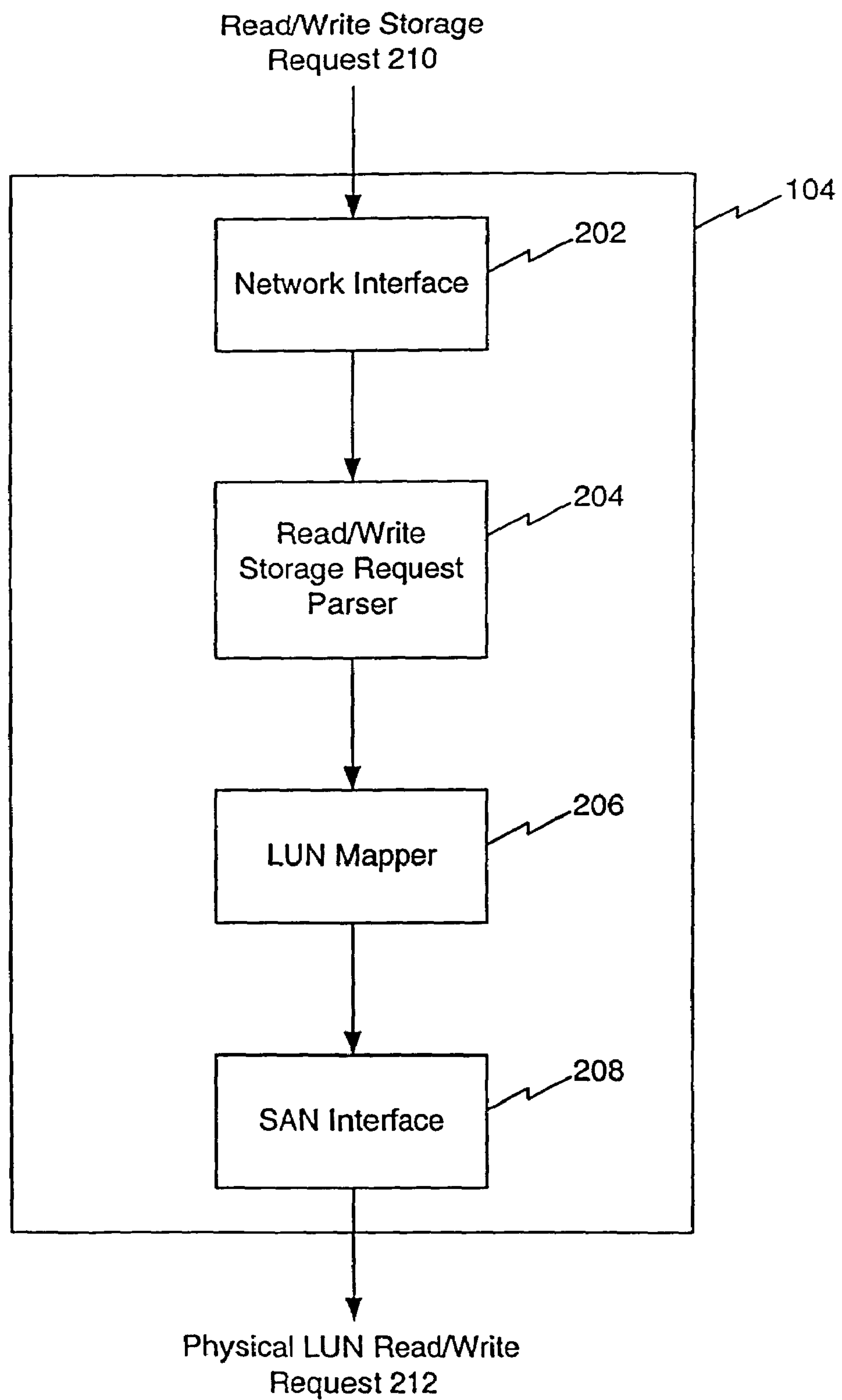
FIG. 2 illustrates a block diagram of a storage allocator, according to an exemplary embodiment of the present invention.

FIG. 2 illustrates a block diagram of a storage allocator 104, according to an exemplary embodiment of the present invention. Storage allocator 104 comprises a network interface 202, a read/write storage request parser 204, a LUN mapper 206, and a SAN interface 208.

Network interface 202 receives a read/write storage request 210 via first communication link 108, shown in FIG. 1. Network interface 202 may include a host bus adaptor (HBA) that interfaces the internal bus architecture of storage allocator 104 with a fibre channel first communication link 108. Network interface 202 may additionally or alternatively include an Ethernet port when first communication link 108 comprises an Ethernet link. Further interfaces, as would be known to persons skilled in the relevant art(s), for network interface 202 are within the scope and spirit of the invention.

Read/write storage request parser 204 receives the read/write storage request 210 from network interface 202, extracts parameters from the read/write storage request 210, and supplies the parameters to LUN mapper 206. These parameters may include a host id, a target HBA, and a target LUN. The host id parameter includes the host id of the storage request initiator server. The target HBA parameter is the particular HBA port address in storage allocator 104 that receives the read/write storage request 210. A server or host may be provided with more than one virtual storage view. The target LUN parameter is the logical unit number of the virtual storage unit to which the read/write storage request 210 is directed. In alternative embodiments, additional or different parameters may be supplied to LUN mapper 206.

LUN mapper 206 receives the extracted parameters from read/write storage request parser 204. LUN mapper 206 stores LUN maps corresponding to servers/hosts, as described above. As described above, available storage is partitioned in the LUN maps without any regard necessarily to the physical divisions of storage devices. These partitions are referred to as virtual or target LUNs. Portions of, or all of available physical storage may be partitioned and presented as virtual LUNs. Each host or server may be presented with different portions of physical storage via the LUN maps, or some hosts may have the same portions presented. Furthermore, each host or server has a set of labels or names it uses to refer to the virtual LUNs stored in the LUN maps, which may be the same as or different from another host's set of labels or names.

Figure 3:
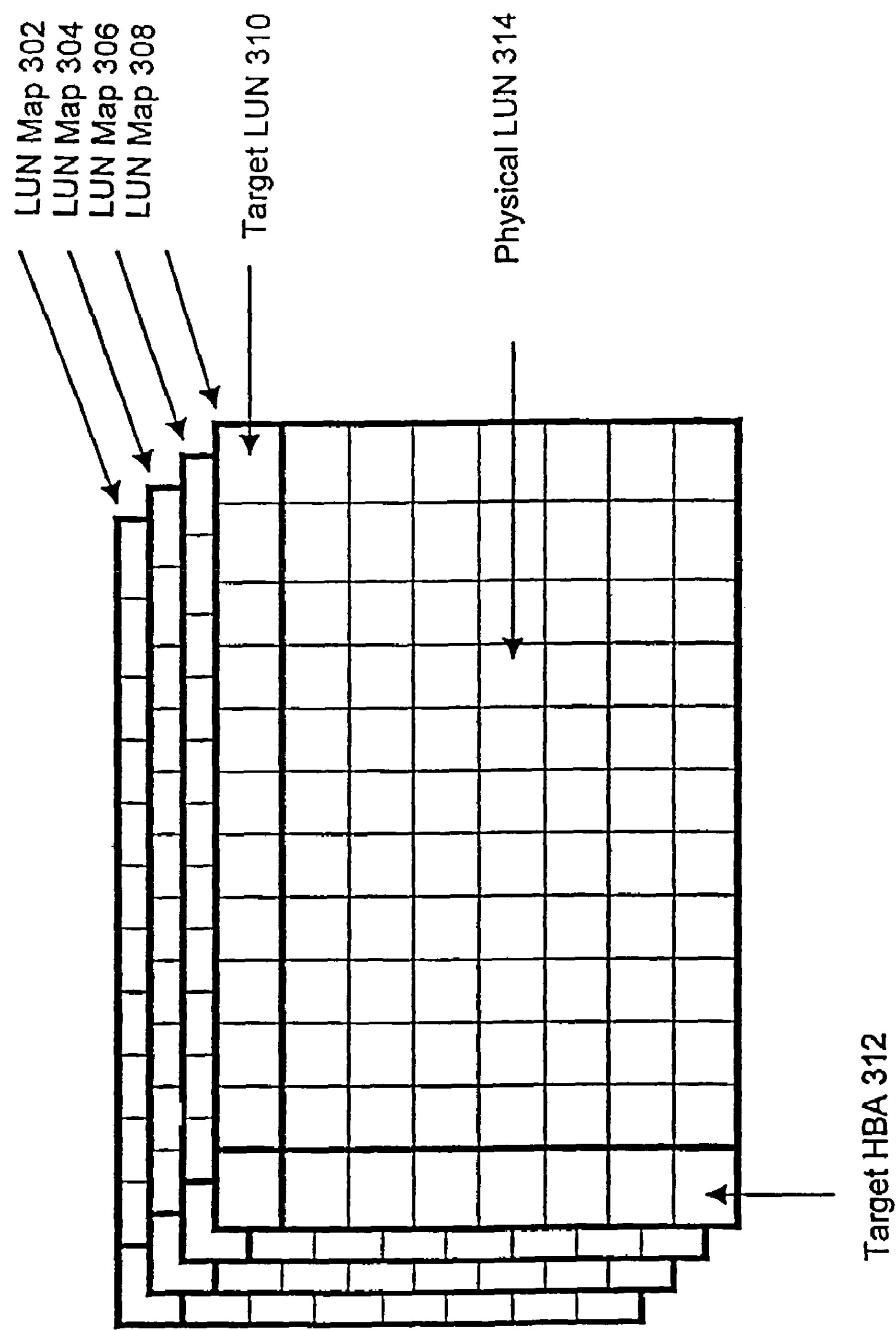
FIG. 3 illustrates an exemplary set of LUN maps, according to embodiments of the present invention.

In an embodiment, LUN maps are identified by their respective server's host id value. Once identified, a LUN map may then be used to convert virtual storage read or write requests from its corresponding server or host to an actual physical storage location or LUN. FIG. 3 illustrates an exemplary set of LUN maps, according to embodiments of the present invention. FIG. 3 shows a first LUN map 302, a second LUN map 304, a third LUN map 306, and a fourth LUN map 308. While four LUN maps are shown in FIG. 3, the present invention is applicable to any number of LUN maps. First, second, third, and fourth LUN maps 302, 304, 306, and 308 are stored in LUN mapper 206.

As shown in FIG. 3, a LUN map may be a two-dimensional matrix. In a preferred embodiment, a LUN map stores a two-dimensional array of physical LUN data. A first axis of the LUN map is indexed by target LUN information, and a second axis of the LUN map is indexed by target HBA information.

In FIG. 2, SAN interface 208 receives a physical LUN read/write request from LUN mapper 206, and transmits it as physical LUN read/write request 212 on second communication link 110 (FIG. 1). In this manner, storage allocator 104 issues the received read/write storage request 210 to the actual storage device or devices comprising the determined physical LUN in the storage area network. SAN interface 208 may include one or more host bus adaptors (HBA) that interface the internal bus architecture of storage allocator 104 with second communication link 110. SAN interface 208 may support fibre channel and/or SCSI transmissions on second communication link 110. Further interfaces, as would be known to persons skilled in the relevant art(s), for SAN interface 208 are within the scope and spirit of the invention.

Figure 4:
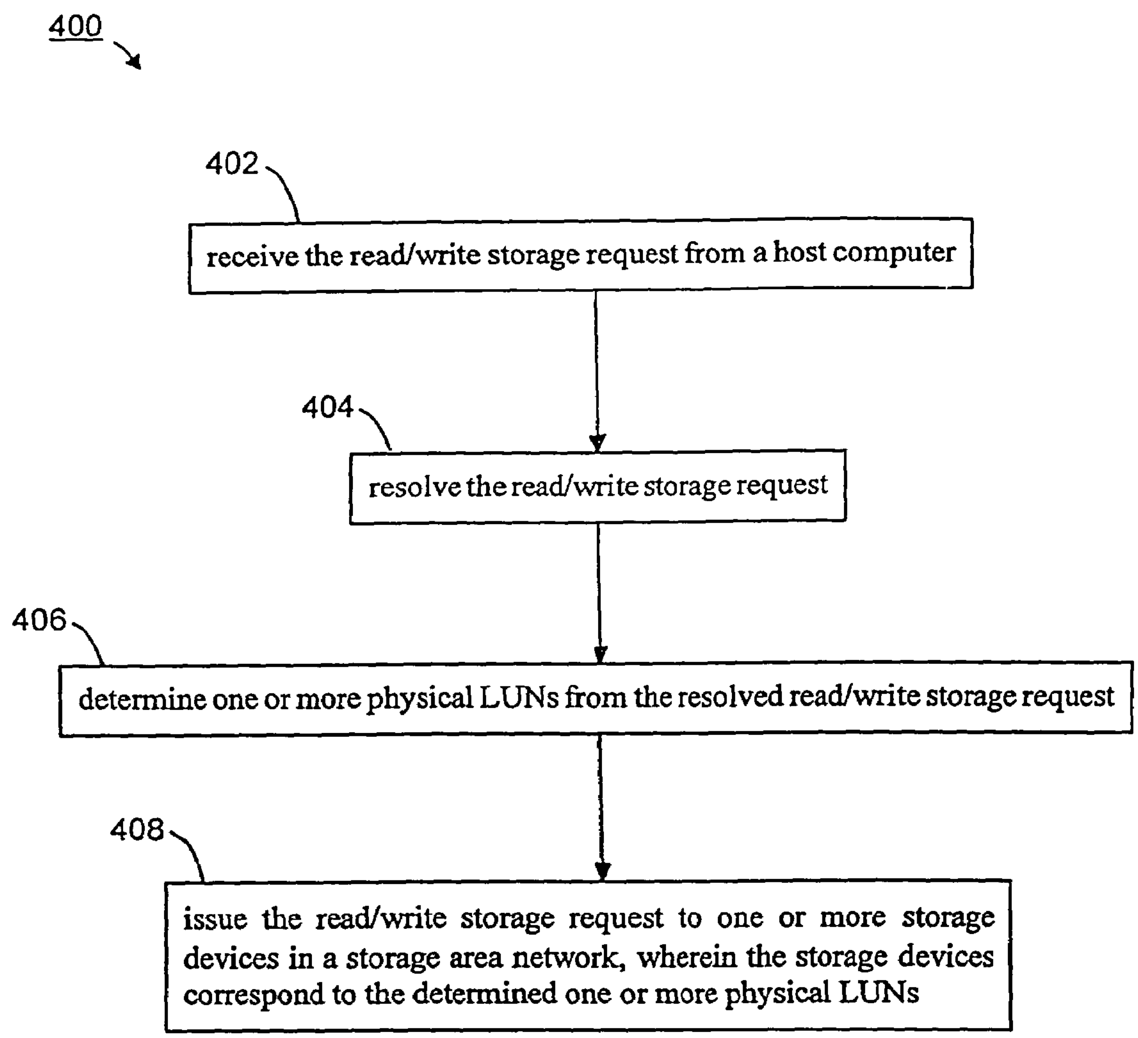
FIG. 4 shows a flowchart providing detailed operational steps of an example embodiment of the present invention.

FIG. 4 shows a flowchart 400 providing operational steps of an example embodiment of the present invention. The steps of FIG. 4 may be implemented in hardware, firmware, software, or a combination thereof. For instance, the steps of FIG. 4 may be implemented by storage allocator 104. Furthermore, the steps of FIG. 4 do not necessarily have to occur in the order shown, as will be apparent to persons skilled in the relevant art(s) based on the teachings herein. Other structural embodiments will be apparent to persons skilled in the relevant art(s) based on the discussion contained herein. These steps are described in detail below.

The process begins with step 402. In step 402, a read/write storage request is received from a host computer. For instance, in embodiments, the read/write storage request may be received by network interface 202 described above.

In step 404, the read/write storage request is resolved. In embodiments, the parameters of host id, target LUN, and target HBA are extracted from the read/write storage request, as described above. In an embodiment, read/write storage request parser 204 may be used to execute step 404.

In step 406, one or more physical LUNs are determined from the resolved read/write storage request. In an embodiment, LUN mapper 206 may be used to execute step 406.

In step 408, an the read/write storage request is issued to one or more storage devices in a storage area network, wherein the storage devices correspond to the determined one or more physical LUNs. In an embodiment, the read/write storage request is a physical LUN read/write storage request 212. In an embodiment, the read/write storage request is issued by LUN mapper 206 to the storage area network via SAN interface 208.

In an exemplary embodiment of the present invention, step 406 may be implemented by the following procedure: To determine a physical LUN corresponding to a resolved read/write storage request, the proper LUN map must be selected. LUN mapper 206 uses the received host id parameter to determine which of the stored LUN maps to use. For example, LUN map 308 may be the proper LUN map corresponding to the received host id. As shown in FIG. 3, the received parameters, target LUN 310 and target HBA 312, are used as X- and Y-coordinates when searching the contents of a LUN map. Applying these parameters as X- and Y-coordinates to the determined LUN map 308, the corresponding physical LUN 314 may be located, and supplied as the actual physical storage location to the requesting server. As would be recognized by persons skilled in the relevant art(s) from the teachings herein, LUN maps may be organized and searched in alternative fashions.

The embodiments for the storage allocator of the present invention described above are provided for purposes of illustration. These embodiments are not intended to limit the invention. Alternate embodiments, differing slightly or substantially from those described herein, will be apparent to persons skilled in the relevant art(s) based on the teachings contained herein.

Storage Area Network Embodiments of the Storage Allocator

The invention may be implemented in any communication network, including LANs, WANs, and the Internet. Preferably the invention is implemented in a storage area network, where many or all of the storage devices in the network are made available to the network's servers. As described above, network configuration 100 of FIG. 1 shows a exemplary block diagram of a storage area network.

Figure 5:
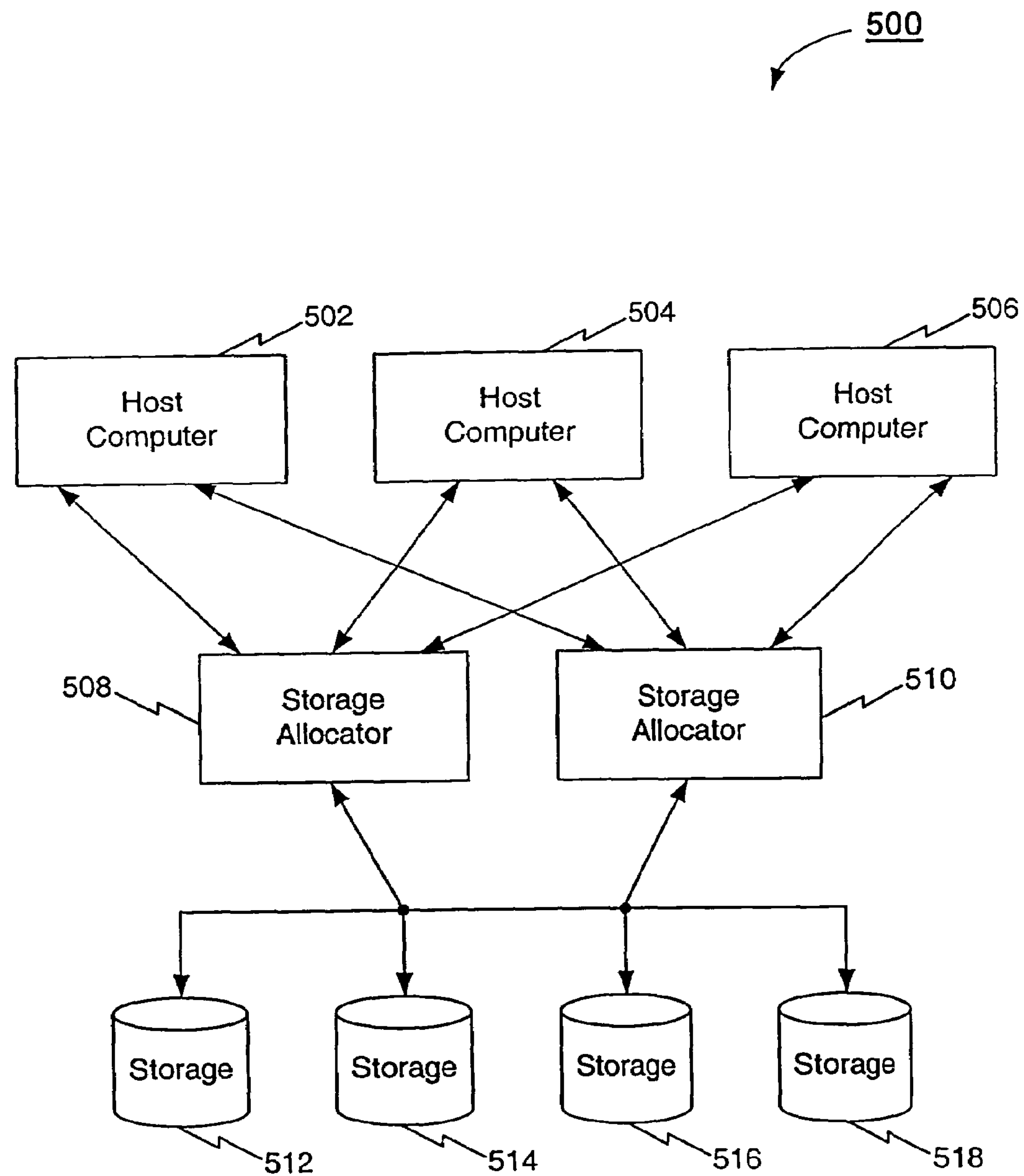
FIGS. 5–7 illustrate storage area network implementations of the present invention, according to embodiments of the present invention.

FIG. 5 illustrates a detailed block diagram of an exemplary storage area network implementation 500, according to an embodiment of the present invention. SAN implementation 500 comprises a first, second, and third host computer 502, 504, and 506, a first and second storage allocator 508 and 510, and a first, second, third, and fourth storage device 512, 514, 516, and 518.

Host computers 502, 504, and 506 are servers on a communications network. Storage allocators 508 and 510 are substantially equivalent to storage allocator 104. Storage allocators 508 and 510 parse storage read and write requests received from host computers 502, 504, and 506, and use the parsed read and write request to determine physical data locations in storage devices 512, 514, 516, and 518. Storage devices 512, 514, 516, and 518 are storage devices that receive physical storage read and write requests from storage allocators 508 and 510, and respond by reading data from or writing data to storage as requested. SAN implementation 500 shows multiple storage allocators, storage allocators 508 and 510, operating in a single SAN. In further embodiments, any number of storage allocators may operate in a single SAN configuration.

As shown in SAN implementation 500, storage allocators 508 and 510 may receive read and write storage requests from one or more of the same host computers. Furthermore, storage allocators 508 and 510 may transmit physical read and write storage requests to one or more of the same storage devices. In particular, storage allocators 508 and 510 may transmit read and write storage request to one or more of the same LUN partitions. Storage allocators 508 and 510 may assign the same or different names or labels to LUN partitions.

Figure 6:
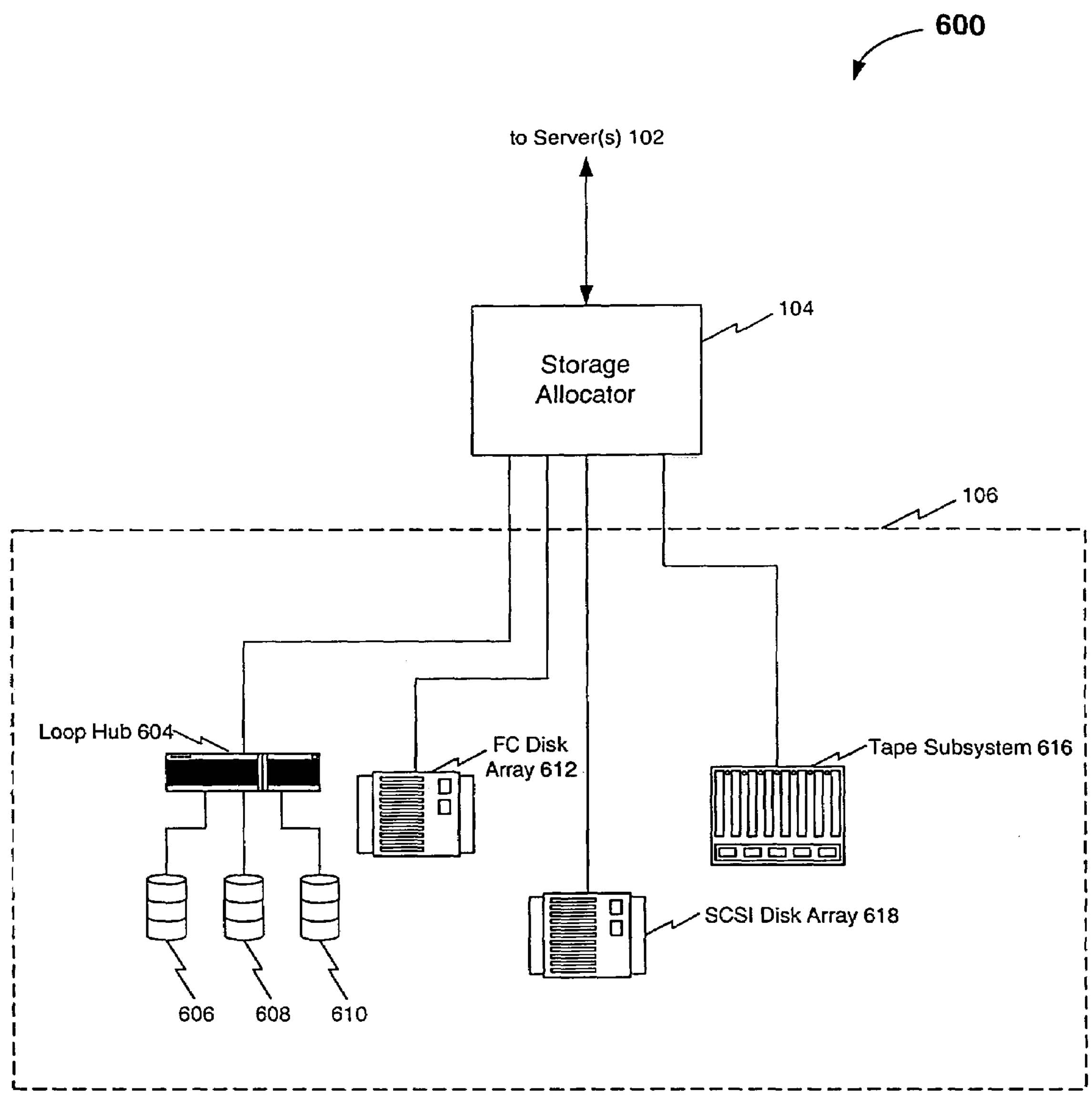

FIG. 6 illustrates a storage area network implementation 600, according to an exemplary embodiment of the present invention. SAN implementation 600 comprises storage allocator 104 and storage 106. Storage 106 comprises a loop hub 604, a first, second, and third disks 606, 608, and 610, a fibre channel disk array 612, a tape subsystem 616, and a SCSI disk array 618.

Storage allocator 104 may receive read and write storage requests from one or more of the host computers of server(s) 102. Furthermore, storage allocator 104 may transmit physical read and write storage requests to one or more of the storage devices of storage 106.

Tape subsystem 616 receives and sends data according to SCSI protocols from/to storage allocator 104.

SCSI disk array 618 is coupled to a SCSI port of storage allocator 104, for data transfer.

Loop hub 604 forms an arbitrated loop with first, second, and third disks 606, 608, and 610. Loop hub 604 and fibre channel disk array 612 are coupled to fibre channel ports of storage allocator 104 via fibre channel communication links.

As described above, multiple LUNs of the storage devices of storage 106 can be merged into a single image for a host (expansion) in server(s) 102. All connected storage units, including first, second, and third disks 606, 608, and 610, fibre channel disk array 612, SCSI disk array 618, and tape subsystem 616, can be presented to a host as a single storage pool irrespective of the storage device types or storage area network topology. As shown in FIG. 106, any storage subsystem types, including different types such as fibre channel disk array 612 and SCSI disk array 618, may be connected to any host in a single storage pool. Alternatively, the storage subsystems can be can be partitioned into multiple LUN portions for a host.

Furthermore, fewer than all storage devices of storage 106 may be made available to a server or host for purposes of security. For example, access to certain storage devices/physical LUNs may be limited to prevent corruption of data. Access to storage devices and/or physical LUNs may be managed by storage allocator 104 via one or more LUN maps, which may operate to limit the LUN(s) that a host sees. This limiting or masking may be used to prohibit a host from accessing data that it does not have permission to access. For example, all of, or any portion of first, second, and third disks 606, 608, and 610, fibre channel disk array 612, SCSI disk array 618, and tape subsystem 616 may be hidden from view to selected servers of server(s) 102 by storage allocator 104.

Figure 7:
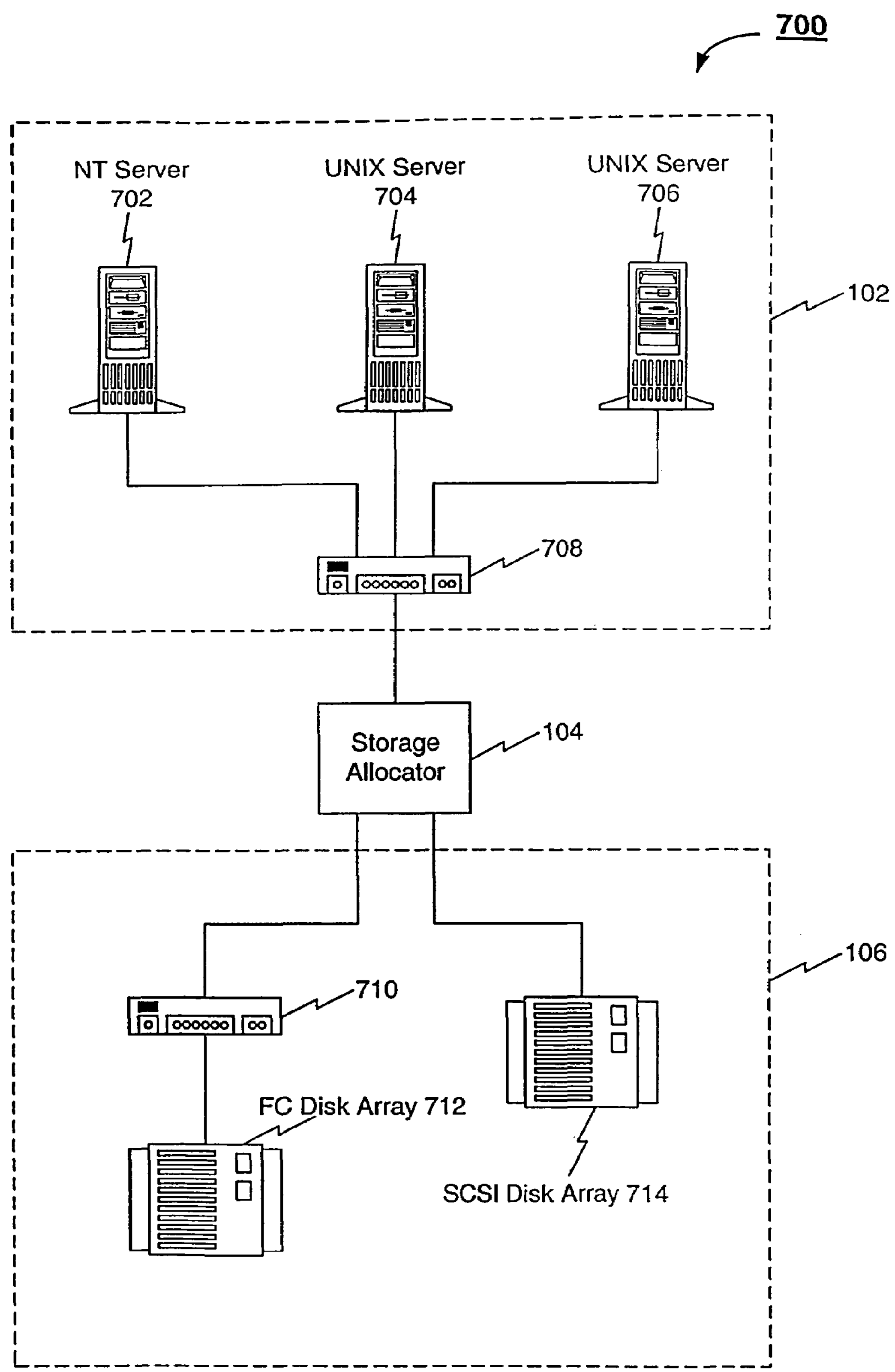

FIG. 7 illustrates a storage area network implementation 700, according to an exemplary embodiment of the present invention. SAN implementation 700 comprises server(s)

102, storage allocator 104, and storage 106. Server(s) 102 comprises an NT server 702, a first UNIX server 704, a second UNIX server 706, and a switch 708. Storage 106 comprises a fibre channel switch 710, a fibre channel disk array 712, and a SCSI disk array 714. SAN implementation 700 will be used to demonstrate an example of LUN mapping, as follows.

In this LUN mapping example, fibre channel disk array 712 includes two LUN divisions, with the following attributes:

| Label | No. of spindles | Capacity |
|---|---|---|
| LUN 0 | 9 | 153 GBytes |
| LUN 1 | 5 | 72 GBytes |

SCSI disk array 714 includes three LUN divisions, with the following attributes:

| Label | No. of spindles | Capacity |
|---|---|---|
| LUN 0 | 2 | 9 GBytes |
| LUN 1 | 2 | 9 GBytes |
| LUN 2 | 5 | 36 GBytes |

Therefore, according to the present example, storage allocator 104 has access to a total storage capacity of five LUNs, with 279 GBytes total, in SAN implementation 700.

In the present example, storage allocator 104 is configured to map or mask the total available storage capacity of 279 GBytes, and present it to the hosts in the form of eleven LUNs, with 181 GBytes total. 98 GBytes of the total available storage is not being made accessible to the hosts.

SAN implementation 700 provides for storage partitioning. Eleven LUNs, or virtual devices, that are a partition five physical LUNs. Each of the eleven LUNs appear to a host as an actual physical device. These virtual LUN partitions are used to share storage from the five physical LUNs across multiple host operating systems. In alternative embodiments, the five physical LUNs may be combined in a variety of ways to provide for storage expansion. In other words, the five LUNs may be merged to create an image of one or more expanded LUNs to the outside world.

SAN implementation 700 also provides for storage security. For example, the 98 GBytes of storage not provided to the servers may be designated as secure storage to be protected from access by the hosts. Furthermore, each server has access to its own set of LUNs. For example, this arrangement may aid in preventing data corruption.

In the present example, the available storage may be apportioned to NT server 702, first UNIX server 704, and second UNIX server 706 as follows.

NT server 702 is presented with three virtual LUNs in the following storage configuration:

| Label | Capacity |
|---|---|
| LUN 0 | 9 GBytes |
| LUN 1 | 24 GBytes |
| LUN 2 | 24 GBytes |

UNIX servers 704 and 706 are each presented with four virtual LUNS in the following storage configuration:

| Label | Capacity |
|---|---|
| LUN 0 | 12 GBytes |
| LUN 1 | 30 GBytes |
| LUN 2 | 10 Gbytes |
| LUN 3 | 10 GBytes |

In the present example, each host has access to separate, non-overlapping physical LUNs or storage locations. As shown, the hosts are provided with different LUNs having the same virtual LUN names. In alternative embodiments, the available storage may be partitioned and presented to the hosts in any number of different ways. For example, two or more hosts may have access to the same storage locations, and/or same LUNs.

In an embodiment, storage allocator 104 is implemented in a SAN appliance or other device. For instance, the SAN appliance/storage allocator may be implemented with aspects of a computer system such as described in further detail below. Users may have access to the computer system's graphical user interface (GUI) where they can manually configure the allocation of storage by the storage allocator. In embodiments, users may also configure operation of the storage allocator over a network, such as the Internet, via a GUI such as a web browser. For instance, the user may be able to designate certain storage devices and/or locations as secure areas, and then allocate storage to the hosts from the remaining locations of storage.

In alternative embodiments, the storage allocator may be configured to operate in a semi-automated or fully automated fashion, where storage is allocated by the operation of a computer algorithm. For instance, a user may be able to designate certain storage devices and/or locations as secure storage areas, or these may be designated automatically. Further, the computer algorithm may then allocate the remaining storage by proceeding from top to bottom through the list of remaining storage devices and/or locations, allocating all of the remaining storage in this order until no further storage is required. Alternatively, storage may be allocated to match storage device access speed with the required storage access speed of specific hosts and applications. Further ways of allocating storage will be known to persons skilled in the relevant art(s) from the teachings herein.

It will be known to persons skilled in the relevant art(s) from the teachings herein that the invention is adaptable to additional or fewer servers, additional or fewer storage devices, and amounts of storage capacity different than presented in the example of SAN implementation 700, and the other SAN implementation examples. Description in these terms is provided for convenience only. It is not intended that the invention be limited to application in this example environment. In fact, after reading the following description, it will become apparent to persons skilled in the relevant arts how to implement the invention in alternative environments known now or developed in the future.

Example Computer System

Figure 10:
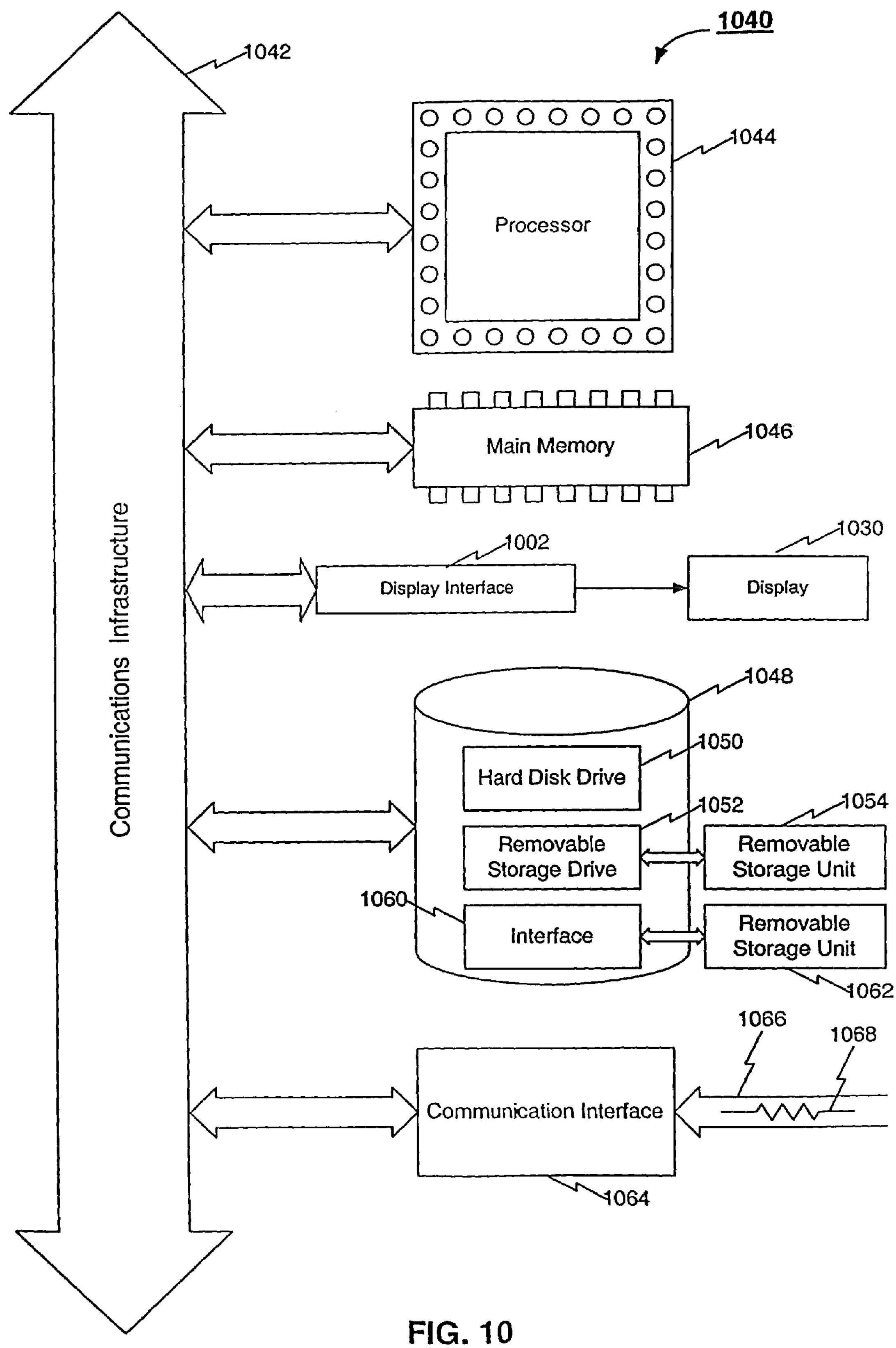
FIG. 10 shows an example of a computer system for implementing the present invention.

An example of a computer system 1040 is shown in FIG. 10. The computer system 1040 represents any single or multi-processor computer. In conjunction, single-threaded and multi-threaded applications can be used. Unified or distributed memory systems can be used. Computer system 1040, or portions thereof, may be used to implement the present invention. For example, the storage allocator of the present invention may comprise software running on a computer system such as computer system 1040.

In one example, the storage allocator of the present invention is implemented in a multi-platform (platform independent) programming language such as JAVA 1.1, programming language/structured query language (PL/SQL), hyper-text mark-up language (HTML), practical extraction report language (PERL), common gateway interface/structured query language (CGI/SQL) or the like. Java™-enabled and JavaScript™-enabled browsers are used, such as, Netscape™, HotJava™, and Microsoft™ Explorer™ browsers. Active content Web pages can be used. Such active content Web pages can include Java™ applets or ActiveX™ controls, or any other active content technology developed now or in the future. The present invention, however, is not intended to be limited to Java™, JavaScript™, or their enabled browsers, and can be implemented in any programming language and browser, developed now or in the future, as would be apparent to a person skilled in the art given this description.

In another example, the storage allocator of the present invention, including read/write storage request parser 204 and LUN mapper 206, may be implemented using a high-level programming language (e.g., C++) and applications written for the Microsoft Windows™ environment. It will be apparent to persons skilled in the relevant art(s) how to implement the invention in alternative embodiments from the teachings herein.

Computer system 1040 includes one or more processors, such as processor 1044. One or more processors 1044 can execute software implementing routines described above, such as shown in flowchart 400. Each processor 1044 is connected to a communication infrastructure 1042 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 1040 can include a display interface 1002 that forwards graphics, text, and other data from the communication infrastructure 1042 (or from a frame buffer not shown) for display on the display unit 1030.

Computer system 1040 also includes a main memory 1046, preferably random access memory (RAM), and can also include a secondary memory 1048. The secondary memory 1048 can include, for example, a hard disk drive 1050 and/or a removable storage drive 1052, representing a floppy disk drive, a magnetic tape drive, an optical disk drive, etc. The removable storage drive 1052 reads from and/or writes to a removable storage unit 1054 in a well known manner. Removable storage unit 1054 represents a floppy disk, magnetic tape, optical disk, etc., which is read by and written to by removable storage drive 1052. As will be appreciated, the removable storage unit 1054 includes a computer usable storage medium having stored therein computer software and/or data.

In alternative embodiments, secondary memory 1048 may include other similar means for allowing computer programs or other instructions to be loaded into computer system 1040. Such means can include, for example, a removable storage unit 1062 and an interface 1060. Examples can include a program cartridge and cartridge interface (such as that found in video game devices), a removable memory chip (such as an EPROM, or PROM) and associated socket, and other removable storage units 1062 and interfaces 1060 which allow software and data to be transferred from the removable storage unit 1062 to computer system 1040.

Computer system 1040 can also include a communications interface 1064. Communications interface 1064 allows software and data to be transferred between computer system 1040 and external devices via communications path 1066. Examples of communications interface 1064 can include a modem, a network interface (such as Ethernet card), a communications port, interfaces described above, etc. Software and data transferred via communications interface 1064 are in the form of signals which can be electronic, electromagnetic, optical or other signals capable of being received by communications interface 1064, via communications path 1066. Note that communications interface 1064 provides a means by which computer system 1040 can interface to a network such as the Internet.

The present invention can be implemented using software running (that is, executing) in an environment similar to that described above with respect to FIG. 8. In this document, the term "computer program product" is used to generally refer to removable storage unit 1054, a hard disk installed in hard disk drive 1050, or a carrier wave carrying software over a communication path 1066 (wireless link or cable) to communication interface 1064. A computer useable medium can include magnetic media, optical media, or other recordable media, or media that transmits a carrier wave or other signal. These computer program products are means for providing software to computer system 1040.

Computer programs (also called computer control logic) are stored in main memory 1046 and/or secondary memory 1048. Computer programs can also be received via communications interface 1064. Such computer programs, when executed, enable the computer system 1040 to perform the features of the present invention as discussed herein. In particular, the computer programs, when executed, enable the processor 1044 to perform features of the present invention. Accordingly, such computer programs represent controllers of the computer system 1040.

The present invention can be implemented as control logic in software, firmware, hardware or any combination thereof. In an embodiment where the invention is implemented using software, the software may be stored in a computer program product and loaded into computer system 1040 using removable storage drive 1052, hard disk drive 1050, or interface 1060. Alternatively, the computer program product may be downloaded to computer system 1040 over communications path 1066. The control logic (software), when executed by the one or more processors 1044, causes the processor(s) 1044 to perform functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s) from the teachings herein.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention.

Thus, the breadth and scope of the present invention should not be limited by any of the above-described exemplary embodiments, but should be defined only in accordance with the following claims and their equivalents.

What is claimed is:

1. A storage area network, comprising:

at least one server;

a plurality of storage devices; and a storage allocator, connected between said at least one server and said plurality of storage devices, said storage allocator including a read/write storage request parser that receives from said at least one server a read/write storage request and extracts therefrom a host id parameter, a target LUN parameter and a target host bus adapter (HBA) parameter, and a logical unit (LUN) mapper that includes a plurality of LUN maps each of which is specific to one of a plurality of hosts, respectively, the LUN mapper being operable to receive[s] from said read/write storage request parser the host id parameter, target LUN parameter and target HBA parameter and to use said host id parameter to select one from among the plurality of LUN maps corresponding to said host id parameter and then to map[s] based thereon to at least one physical LUN, wherein said at least one physical LUN represents at least one storage location within said plurality of storage devices.

2. The network of claim 1 wherein said LUN mapper applies said target LUN parameter and said target HBA parameter to said selected LUN map to locate said at least one physical LUN stored in said selected LUN map.

3. The network of claim 2, wherein said LUN mapper issues said received read/write storage request to at least one storage device corresponding to said at least one physical LUN, wherein said at least one storage device is located in said plurality of storage devices.

4. The network of claim 2, wherein said selected LUN map comprises a two-dimensional array of physical LUN data, wherein a first axis of said LUN map is indexed by target LUN information and a second axis of said LUN map is indexed by target HBA information.

5. A method for allocating storage in a storage area network, comprising the steps of:

providing a plurality of LUN maps each of which is specific to one of a plurality of hosts, respectively;

receiving a read/write storage request from a host computer;

extracting a host id parameter, a target LUN parameter and a target host bus adapter (HBA) parameter from the read/write storage request;

selecting one from among the plurality of LUN maps based upon the host id parameter;

determining a physical LUN based upon the selected LUN map, the target LUN parameter and the target HBA adapter; and issuing a read/write storage request to a storage device in a storage area network, wherein the storage device corresponds to the determined physical LUN.

6. The method of claim 5, wherein said determining step comprises the step[s] of:

applying said extracted parameters of target LUN and target HBA to said selected LUN map to determine the physical LUN.

7. The method of claim 6, wherein said selected LUN map comprises a two-dimensional array of physical LUN data, where said applying step comprises the steps of:

applying said extracted target LUN parameter to a first axis of said selected LUN map;

applying said extracted target HBA parameter to a second axis of said selected LUN map; and locating the physical LUN in said selected LUN map at the intersection of said applied extracted target LUN and said applied extracted target HBA parameters.

8. A system for allocating storage resources in a storage area network, comprising:

a memory to store a plurality of LUN maps each of which is specific to one of a plurality of hosts, respectively;

means for receiving a read/write storage request from a host computer;

means for extracting a host id parameter, a target LUN parameter and a target host bus adapter (HBA) parameter from the read/write storage request;

means for selecting one from among the plurality of LUN maps based upon the host id parameter;

means for determining a physical LUN from the selected LUN maps, the target LUN parameter and the target HBA parameter; and means for issuing a read/write storage request to a storage device in a storage area network, wherein the storage device corresponds to the determined physical LUN.

9. The system of claim 8, wherein said determining means comprises:

means for applying said extracted parameters of target LUN and target HBA to said selected LUN map to determine the physical LUN.

10. The system of claim 9, wherein said selected LUN map comprises a two-dimensional array of physical LUN data, where said applying means comprises:

means for applying said extracted target LUN parameter to a first axis of said selected LUN map;

means for applying said extracted target HBA parameter to a second axis of said selected LUN map; and means for locating the physical LUN in said selected LUN map at the intersection of said applied extracted target LUN and said applied extracted target HBA parameters.

* * * * *

UNITED STATES PATENT AND TRADEMARK OFFICE

CERTIFICATE OF CORRECTION

PATENT NO. : 6,977,927 B1
APPLICATION NO. : 09/664500
DATED : December 20, 2005
INVENTOR(S) : John W. Bates et al.

It is certified that error appears in the above-identified patent and that said Letters Patent is hereby corrected as shown below:

In column 17, line 20, in Claim 1, delete “receive[s]” and insert -- receive --, therefor.

In column 17, line 25, in Claim 1, delete “map[s]” and insert -- map --, therefor.

In column 18, line 5, in Claim 6, delete “step[s]” and insert -- step --, therefor.

Signed and Sealed this

Fourteenth Day of July, 2009

JOHN DOLL

*Acting Director of the United States Patent and Trademark Office*